(12) United States Patent
Jiang et al.

(10) Patent No.: US 11,223,041 B2
(45) Date of Patent: Jan. 11, 2022

(54) ANODE ACTIVE MATERIAL AND ANODE, ELECTROCHEMICAL DEVICE AND ELECTRONIC DEVICE USING THE SAME

(71) Applicant: NINGDE AMPEREX TECHNOLOGY LIMITED, Ningde (CN)

(72) Inventors: Daoyi Jiang, Ningde (CN); Zhihuan Chen, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 365 days.

(21) Appl. No.: 16/393,182

(22) Filed: Apr. 24, 2019

(65) Prior Publication Data
US 2020/0266428 A1   Aug. 20, 2020

(30) Foreign Application Priority Data

Feb. 20, 2019   (CN) .......................... 201910125082.5

(51) Int. Cl.
*H01M 4/36*   (2006.01)
*H01M 4/38*   (2006.01)
(Continued)

(52) U.S. Cl.
CPC ........... *H01M 4/366* (2013.01); *H01M 4/131* (2013.01); *H01M 4/133* (2013.01); *H01M 4/364* (2013.01);
(Continued)

(58) Field of Classification Search
None
See application file for complete search history.

(56) References Cited

U.S. PATENT DOCUMENTS

2016/0344019 A1\* 11/2016 Hirose ................. H01M 4/366
2017/0149050 A1   5/2017 Hirose et al.
(Continued)

FOREIGN PATENT DOCUMENTS

CN         1505187 A    12/2006
CN       103339767 A    10/2013
(Continued)

OTHER PUBLICATIONS

Chinese First Office Action dated Jul. 10, 2020 in counterpart application CN 201910125082.5, 6 pages in Chinese.
(Continued)

*Primary Examiner* — Tracy M Dove
(74) *Attorney, Agent, or Firm* — Juan Carlos A. Marquez; Marquez IP Law Office, PLLC

(57) ABSTRACT

The present application relates to an anode active material and an anode, an electrochemical device and an electronic device using the same. Specifically, the present application provides an anode active material, including a lithiated silicon-oxygen material and a coating layer, where the coating layer and the lithiated silicon-oxygen material at least have one or more structural units selected from formulae $-\!\!+\!CF_2\!\!-\!\!+_a$, $-\!\!+\!CHF\!\!-\!\!+_b$ and $-\!\!+\!CH_2\!\!-\!\!+_c$ therebetween, where a, b, and c are integers greater than or equal to 6. The anode active material of the present application has high stability and is suitable for being subjected to aqueous processing to obtain the anode.

20 Claims, 2 Drawing Sheets

(51) Int. Cl.
  *H01M 4/134* (2010.01)
  *H01M 4/131* (2010.01)
  *H01M 4/133* (2010.01)
  *H01M 10/0569* (2010.01)
  *H01M 10/0525* (2010.01)
  *H01M 4/62* (2006.01)

(52) U.S. Cl.
  CPC ........... *H01M 4/382* (2013.01); *H01M 4/386* (2013.01); *H01M 4/622* (2013.01); *H01M 10/0525* (2013.01); *H01M 10/0569* (2013.01)

(56) References Cited

U.S. PATENT DOCUMENTS

2018/0175377 A1  6/2018  Hirose et al.
2018/0287140 A1* 10/2018  Akira ..................... H01M 4/62

FOREIGN PATENT DOCUMENTS

| | | |
|---|---|---|
| CN | 103943827 A | 7/2014 |
| CN | 104628759 A | 5/2015 |
| CN | 106067543 A | 11/2016 |
| CN | 106463716 A | 2/2017 |
| CN | 108269979 A | 7/2018 |
| CN | 108321368 A | 7/2018 |
| CN | 109888217 A | 6/2019 |
| JP | 2007234255 A | 9/2007 |
| JP | 2017152358 A | 8/2017 |
| WO | 2018221258 A1 | 12/2018 |

OTHER PUBLICATIONS

International Search Report dated Mar. 12, 2020, in counterpart PCT application PCT/CN2019/123339, 5 pages.

* cited by examiner

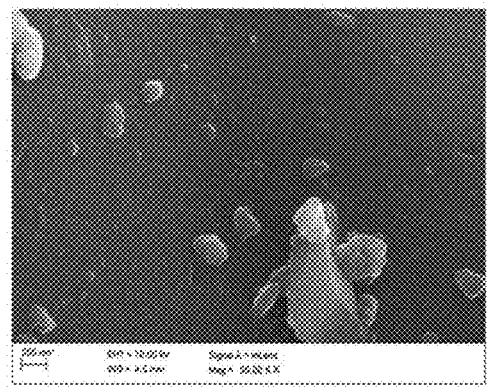
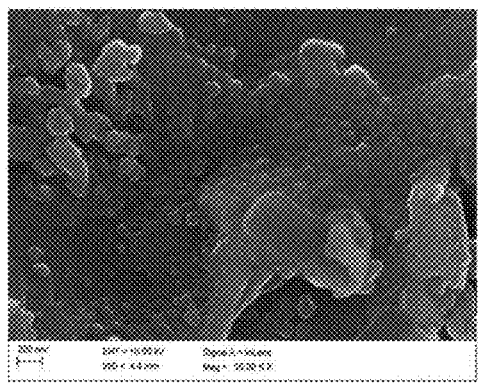
FIG. 2A  FIG. 2B
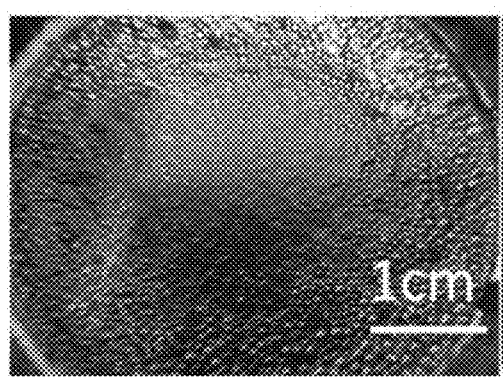
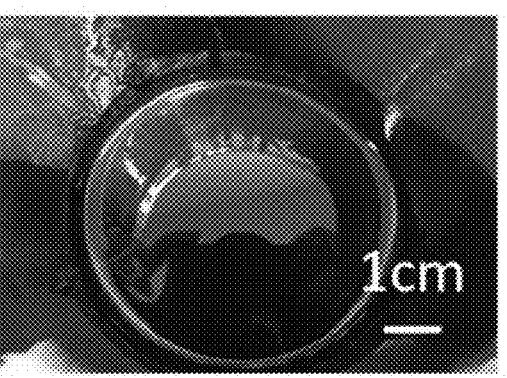
FIG. 3A  FIG. 3B

ANODE ACTIVE MATERIAL AND ANODE, ELECTROCHEMICAL DEVICE AND ELECTRONIC DEVICE USING THE SAME

BACKGROUND

1. Technical Field

The present application relates to energy storage, and in particular, to an anode active material and an anode, an electrochemical device and an electronic device using the same, particularly a lithium-ion battery.

2. Description of the Related Art

With the widespread use of electronic devices such as cameras, digital video cameras, mobile phones and notebook computers, performance requirements for electrochemical devices (e.g., lithium-ion batteries) are increasing. Lithium-ion batteries have been widely used in various fields due to their advantages, such as high energy density, long cycle life, no memory effect, and the like. Silicon-oxygen materials have the advantages of high capacity, low volume expansion, good cycle stability and the like, and thus, are most likely to be anode active materials for next-generation lithium-ion batteries. However, its first coulombic efficiency, which is generally less than 75%, is an important reason for its limited practical application. In order to resolve this technical problem, some people propose to pre-lithiate the silicon-oxygen material to increase its first coulombic efficiency to more than 90%. However, pre-lithiated silicon-oxygen material is inferior in water-resistance stability compared with intrinsic silicon-oxygen materials. Therefore, when water is used as a solvent to produce a pre-lithiated silicon-oxygen material slurry in order to produce an anode, there is a problem of process incompatibility. When preparing the slurry, high-speed stirring and high-viscosity kneading operations are usually employed, which seriously damages the entire structure of the pre-lithiated silicon-oxygen material so that highly reactive silicon nanoparticles therein are exposed to and more easily in contact with water, generating hydrogen gas. This will seriously reduce the capacity and cycle stability of the material. Moreover, hydrogen or gelation is liable to result in the production of the lithiated silicon-oxygen material slurry, which seriously affects the storage stability and safety of the slurry.

In view of the above, it is indeed necessary to provide a pre-lithiated silicon-oxygen anode active material which has high water-resistance stability to adapt to the conventional aqueous processing of an anode, an electrochemical device and an electronic device using the same.

SUMMARY

The present application resolves at least one problem that exists in related fields, at least to some extent by providing a pre-lithiated silicon-oxygen anode active material which has high water-resistance stability to adapt to the conventional aqueous processing, an anode, an electrochemical device and an electronic device using the same.

In one embodiment, the present application provides an anode active material having high water-resistance stability, which includes a lithiated silicon-oxygen material and a coating layer, where the coating layer and the lithiated silicon-oxygen material at least have one or more structural units selected from formulae $-\!\!\operatorname{\!\!+\!\!CF_2\!\!\!+\!\!}_a$, $-\!\!\operatorname{\!\!+\!\!CHF\!\!\!+\!\!}_b$ and $-\!\!\operatorname{\!\!+\!\!CH_2\!\!\!+\!\!}_c$ therebetween, where a, b, and c are integers greater than or equal to 6.

According to some embodiments of the present application, the lithiated silicon-oxygen material includes one or more of $Li_2SiO_3$, $Li_6Si_2O_7$, $Li_2Si_2O_5$ and $Li_4SiO_4$.

According to some embodiments of the present application, the structural unit is derived from a silane having the structural unit.

According to some embodiments of the present application, the coating layer and the lithiated silicon-oxygen material at least have an —O—Si—R bond therebetween, where R is the structural unit.

According to some embodiments of the present application, the silane has the following formula:

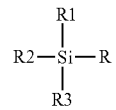

where:
R, R1, R2 and R3 are each independently selected from hydrogen, $C_{6-24}$alkyl, $C_{6-24}$fluoroalkyl or $C_{1-3}$alkoxy.

According to some embodiments of the present application, at least one of R, R1, R2 and R3 is $C_{6-24}$ alkyl and at least one of them is $C_{1-3}$alkoxy.

According to some embodiments of the present application, at least one of R, R1, R2 and R3 is $C_{6-24}$ fluoroalkyl and at least one of them is $C_{1-3}$ alkoxy.

According to some embodiments of the present application, the silane is selected from one or more of the following: tridecafluoro-n-octyltriethoxysilane, hexyltrimethoxysilane, dodecyltrimethoxysilane, trimethoxy(7-octen-1-yl)silane, octadecyltrimethoxysilane, octyltrimethoxysilane, heptadecafluorodecyltrimethoxysilane, n-octyltriethoxysilane, octadecyltriethoxysilane and octylmethyldimethoxysilane.

According to some embodiments of the present application, the Fourier infrared spectrum of the anode active material has characteristic absorption peaks of $2,847\pm5$ cm$^{-1}$ and $2,917\pm5$ cm$^{-1}$.

According to some embodiments of the present application, the lithiated silicon-oxygen material includes nano silicon grains, where the nano silicon grains have a grain size of less than about 10 nm. According to some embodiments of the present application, the nano silicon grains have a grain size of less than about 5 nm.

In another embodiment, the present application provides an anode, including a substrate and the anode active material according to the embodiments of the present application.

In another embodiment, the present application provides an electrochemical device, including a cathode and the anode according to the embodiments of the present application.

In another embodiment, the present application provides an electronic device, including the electrochemical device according to the embodiments of the present application.

Additional aspects and advantages of the embodiments of the present application will be described or shown in the following descriptions or interpreted by implementing the embodiments of the present application.

BRIEF DESCRIPTION OF THE DRAWINGS

The following will briefly illustrate the drawings necessary to describe the embodiments of the present application or the existing technology so as to facilitate the description of the embodiments of the present application. Obviously, the drawings described below are only part of the embodiments of the present application. For those skilled in the art, the drawings of other embodiments can still be obtained according to the structures illustrated in the drawings without any creative effort.

FIG. 2A shows the surface SEM morphology of the anode active material of Comparative Example 1.

FIG. 2B shows the surface SEM morphology of the anode active material of Embodiment 9.

FIG. 3A shows the appearance of the anode slurry of Comparative Example 1 after standing for 48 h.

FIG. 3B shows the appearance of the anode slurry of Embodiment 9 after standing for 48 h.

DETAILED DESCRIPTION

Figure 1:
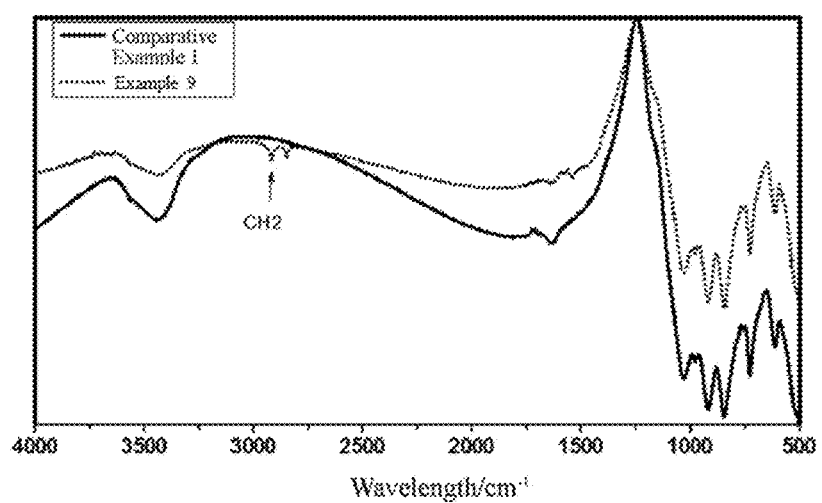
FIG. 1 shows a Fourier infrared spectrum of the anode active material according to Comparative Example 1 and Embodiment 9.

Embodiments of the present application are described in detail below. The embodiments of the present application should not be construed as limiting the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when used in conjunction with a numerical value, terms may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other values are sometimes presented in range formats in the present application. It should be appreciated that such range formats are for convenience and conciseness, and should be flexibly understood as comprising not only values explicitly specified to range constraints, but also all individual values or sub-ranges within the ranges, like explicitly specifying each value and each sub-range.

The term "alkyl" is intended to be a linear chain saturated hydrocarbon structure having 1 to 20 carbon atoms. The "alkyl" is also intended to be a branched or cyclic hydrocarbon structure having 3 to 20 carbon atoms. For example, the alkyl may be alkyl having 1-20 carbon atoms, alkyl having 1-10 carbon atoms, alkyl having 1-5 carbon atoms, alkyl having 5-20 carbon atoms, alkyl having 5-15 carbon atoms or alkyl having 5-10 carbon atoms. When an alkyl having a specific carbon number is specified, it is intended to cover all geometric isomers having that carbon number; therefore, for example, "butyl" means to include n-butyl, sec-butyl, isobutyl, tert-butyl and cyclobutyl; and "propyl" includes n-propyl, isopropyl and cyclopropyl. Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl and the like. Additionally, the alkyl can be optionally substituted.

The term "alkoxy" means that a hydrogen atom in the alkyl is substituted by an oxygen atom. Examples of alkoxy include, but are not limited to, methoxy, ethoxy, propoxy, isopropoxy, and the like.

The term "fluoroalkyl" means that hydrogen atoms in the alkyl are completely or partially substituted by fluorine atoms.

I. Anode

The silicon-oxygen material is a material having good cycle stability (when it is higher than 500 cycles, capacity retention rate is still 80% and above), high capacity (1,500-1,800 mAh/g) and low cycle expansion (volume expansion is 160% and below), and therefore, is suitable as a material for the battery anode active substance according to the embodiments of the present application.

However, the silicon-oxygen material has high irreversible capacity, making its first coulombic efficiency generally less than 75%. This problem has become the biggest obstacle limiting the application of the silicon-oxygen material. In this regard, some current lithiation manners (electrochemical, lithium source thermal sintering and solution methods) can increase the coulombic efficiency of silicon-oxygen to 88% and above, but the pre-lithiated silicon-oxygen material obtained is generally incompatible with a conventional electrode aqueous processing method. For example, the lithiated material is liable to generate $H_2$ gas during a slurrying process, which seriously reduces the capacity and cycle stability of the material, $H_2$ or gelation is liable to result, which seriously affects the storage stability and safety of the slurry. Therefore, according to the present application, the lithiated silicon-oxygen material having high water-resistance stability is more suitable as an anode active material for a next-generation lithium-ion battery.

According to the embodiments of the present application, in the preparation of the anode, water is usually used as a solvent to disperse the anode active material in consideration of environmental protection, cost, safety and other challenges. In order to obtain good and stable slurry, high-intensity kneading or high-speed dispersion is usually used during the dispersing process, which inevitably destroys materials having low water-resistance stability. A buffer phase in the pre-lithiated silicon-oxygen material is typically composed of a mixture of a series of silicates (e.g. $Li_2SiO_3$, $Li_6Si_2O_7$, $Li_2Si_2O_5$, $Li_4SiO_4$ or a mixture thereof). These silicates do not have high water-resistance stability and will be subjected to dehydration polymerization in an aqueous system to produce a series of silicon-oxygen clusters. These silicon-oxygen clusters are highly susceptible to acid-base fluctuations in a slurry system to further polymerize, and generate gel.

Further, according to the embodiments of the present application, in the preparation of the anode, water is usually used as a solvent to prepare the slurry. In this process, it is necessary to wet the material with a binder or dispersing agent by using a high-speed shearing force, which seriously damages the entire structure of the anode active material. This exposes the highly reactive silicon nanoparticles of the silicon-oxygen material in the anode active material so that it is easier to contact with water, generating hydrogen, and thereby seriously reducing the capacity and cycle stability of the silicon-oxygen material. Furthermore, hydrogen generated during the large-scale preparation of the anode active material slurry seriously affects the storage stability and safety of the slurry.

Accordingly, the lithiated silicon-oxygen material has a certain impact on the production process and storage stability of the slurry composed of the anode active material produced therefrom, which seriously affects uniformity and coating effectiveness.

In order to overcome the foregoing problems, the present application provides a highly water-resistant anode active material that is conducive to conventional aqueous processing techniques. The anode active material includes a lithiated silicon-oxygen material and a coating layer, where the coating layer and the lithiated silicon-oxygen material at least have one or more structural units selected from formulae $-\!\!\!+\!CF_2\!\!+\!\!\!-_a$, $-\!\!\!+\!CHF\!\!+\!\!\!-_b$ and $-\!\!\!+\!CH_2\!\!+\!\!\!-_c$ therebetween, where a, b, and c are integers greater than or equal to 6. In some embodiments, a, b, and c are integers greater than or equal to 8. In some embodiments, a, b, and c are integers greater than or equal to 10. In some embodiments, a, b, and c are integers greater than or equal to 12. In some embodiments, a, b, and c are integers greater than or equal to 18. In some embodiments, a, b and c are 6, 7, 8, 9, 10, 11, 12, 13, 14, 15, 16, 17, 18, 19, 20, or the like. In some embodiments, the coating layer further includes an element selected from a hydrogen element and an oxygen element.

After hydrolysis, the lithiated silicon-oxygen material forms a hydrated layer mainly composed of silicon hydroxy groups on the surface of the silicon-oxygen material. After the surface of the lithiated material is hydrophobized with a long chain silane, the alkoxy of a silane modifier is hydrolyzed to produce silanol. The silanol can be dehydrated and condensed with the silicate to bond the hydrophobic long chain-containing silane material to the surface of the lithiated silicon-oxygen material, and the hydrophobic long chain exhibits a collapsed state on the surface of the lithiated silicon-oxygen material. Therefore, the hydrophobized lithiated silicon-oxygen material can effectively block the penetration of water molecules into the interior of a matrix, thereby alleviating or inhibiting the problem whereby the high-activity silicon reacts with water to generate hydrogen. In addition, the long chain silane with which the surface of the lithiated silicon-oxygen material is coated can also increase the surface integrity of the particles and increase the repulsion between the particles, thereby alleviating the particle connection, gelation and precipitation caused by the hydrolysis of the silicate in the material to some extent, and further significantly improving the stability of the lithiated silicon-oxygen material during aqueous processing.

According to some embodiments of the present application, the lithiated silicon-oxygen material includes one or more of $Li_2SiO_3$, $Li_6Si_2O_7$, $Li_2Si_2O_5$ and $Li_4SiO_4$.

According to some embodiments of the present application, a structural unit is derived from a silane having the structural unit.

According to some embodiments of the present application, the coating layer and the lithiated silicon-oxygen material at least have an —O—Si—R bond therebetween, where R is the structural unit.

According to some embodiments of the present application, the silane has the following formula:

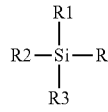

where:
R, R1, R2 and R3 are each independently selected from hydrogen, $C_{6-24}$alkyl, $C_{6-24}$fluoroalkyl or $C_{1-3}$alkoxy.

According to some embodiments of the present application, at least one of R, R1, R2 and R3 is $C_{6-24}$alkyl and at least one of them is $C_{1-3}$alkoxy.

According to some embodiments of the present application, at least one of R, R1, R2 and R3 is $C_{6-24}$fluoroalkyl and at least one of them is $C_{1-3}$alkoxy.

According to some embodiments of the present application, the silane is selected from one or more of the following: tridecafluoro-n-octyltriethoxysilane, hexyltrimethoxysilane, dodecyltrimethoxysilane, trimethoxy(7-octen-1-yl)silane, octadecyltrimethoxysilane, octyltrimethoxysilane, heptadecafluorodecyltrimethoxysilane, n-octyltriethoxysilane, octadecyltriethoxysilane and octylmethyldimethoxysilane.

According to some embodiments of the present application, a Fourier infrared spectrum of the anode active material has characteristic absorption peaks of $2,847\pm5$ cm$^{-1}$ and $2,947\pm5$ cm$^{-1}$.

According to some embodiments of the present application, the lithiated silicon-oxygen material includes nano silicon grains. In some embodiments, the nano silicon grains have an X-ray diffraction peak produced by a silicon (111) crystal plane having a 2θ value of $28.3\pm0.1°$ and a half-width of greater than $0.81°$. According to the Scherrer equation, the nano silicon grains have a grain size of less than about 10 nm. In some embodiments, the nano silicon grains have a grain size of less than about 5 nm.

According to some embodiments of the present application, the surface of the lithiated silicon-oxygen material is at least partially covered with a carbon layer having the thickness of about 5 nm to about 100 nm. In some embodiments, the carbon layer has the thickness of about 5 nm to about 80 nm. In some embodiments, the carbon layer has the thickness of about 5 nm to about 60 nm. In some embodiments, the carbon layer has the thickness of about 5 nm to about 40 nm. In some embodiments, the carbon layer has the thickness of about 5 nm to about 20 nm.

In another embodiment, the present application provides an anode, including a substrate and the anode active material according to the embodiments of the present application. In some embodiments, the substrate is copper foil.

II. Cathode

The cathode materials, compositions and manufacturing methods thereof applicable in the embodiments of the present application include any of the techniques well known to those skilled in the art. In some embodiments, the cathode is a cathode disclosed in the U.S. Pat. No. 9,812,739B, which is incorporated into the present application in its entity.

In some embodiments, the cathode includes a current collector and a cathode active material layer on the current collector. The cathode active material includes at least one lithiated intercalation compound that reversibly intercalates and deintercalates lithium ions. In some embodiments, the cathode active material includes a composite oxide. In some embodiments, the composite oxide contains lithium and at least one element selected from cobalt, manganese and nickel.

In some embodiments, the cathode active material includes, but is not limited to:
$Li_aA_{1-b}X_bD_2$ (0.90≤a≤1.8, 0≤b≤0.5),
$Li_aE_{1-b}X_bO_{2-c}D_c$ (0.90≤a≤1.8, 0≤b≤0.5, 0≤c≤0.05),
$Li_aE_{2-b}X_bD_4$ (0.90≤a≤1.8, 0≤b≤0.5),
$Li_aE_{2-b}X_bO_{4-c}D_c$ (0.90≤a≤1.8, 0≤b≤0.5, 0≤c≤0.05),
$Li_aNi_{1-b-c}Co_bX_cD_\alpha$ (0.90≤a≤1.8, 0≤b≤0.5, 0≤c≤0.05, 0<α≤2),
$Li_aNi_{1-b-c}CO_bX_cO_{2-\alpha}T_\alpha$ (0.90≤a≤1.8, 0≤b≤0.5, 0≤c≤0.05, 0<α<2), $Li_aNi_{1-b-c}Co_bX_cO_{2-\alpha}T_2$ (0.90≤a≤1.8, 0≤b≤0.5, 0≤c≤0.05, 0<α<2),
$Li_aNi_{1-b-c}Mn_bX_cD_\alpha$ (0.90≤a≤1.8, 0≤b≤0.5, 0≤c≤0.05, 0<α≤2),
$Li_aNi_{1-b-c}Mn_bX_cO_{2-\alpha}T_\alpha$ (0.90≤a≤1.8, 0≤b≤0.5, 0≤c≤0.05, 0<α<2),
$Li_aNi_{1-b-c}Mn_bX_cO_{2-\alpha}T_2$ (0.90≤a≤1.8, 0≤b≤0.5, 0≤c≤0.05, 0<α<2),
$Li_aNi_bE_cG_dO_2$ (0.90≤a≤1.8, 0≤b≤0.9, 0≤c≤0.5, 0.001≤d≤0.1),
$Li_aNi_bCo_cMn_dG_eO_2$ (0.90≤a≤1.8, 0≤b≤0.9, 0≤c≤0.5, 0≤d≤0.5, 0.001≤e≤0.1),
$Li_aNiG_bO_2$ (0.90≤a≤1.8, 0.001≤b≤0.1),
$Li_aCoG_bO_2$ (0.90≤a≤1.8, 0.001≤b≤0.1),
$Li_aMnG_bO_2$ (0.90≤a≤1.8, 0.001≤b≤0.1),
$Li_aMn_2G_bO_4$ (0.90≤a≤1.8, 0.001≤b≤0.1),
$QO_2$, $QS_2$, $LiQS_2$, $V_2O_5$, $LiV_2O_5$, $LiIO_2$, $LiNiVO_4$, $Li_{(3-f)}J_2(PO_4)_3$ (0≤f≤2), $Li_{(3-f)}Fe_2(PO_4)_3$ (0≤f≤2) or $LiFePO_4$, where, A is selected from Ni, Co, Mn and any combination thereof; X is selected from Al, Ni, Co, Mn, Cr, Fe, Mg, Sr, V, rare-earth elements and any combination thereof; D is selected from O, F, S, P and any combination thereof; E is selected from Co, Mn and any combination thereof; T is selected from F, S, P and any combination thereof; G is selected from Al, Cr, Mn, Fe, Mg, La, Ce, Sr, V and any combination thereof; Q is selected from Ti, Mo, Mn and any combination thereof; I is selected from Cr, V, Fe, Sc, Y and any combination thereof; and J is selected from V, Cr, Mn, Co, Ni, Cu and any combination thereof.

In some embodiments, the cathode active material is selected from lithium cobaltate ($LiCoO_2$), a lithium nickel cobalt manganese (NCM) ternary material, lithium iron phosphate ($LiFePO_4$), lithium manganate ($LiMn_2O_4$) and any combination thereof. In some embodiments, the cathode active material is lithium cobaltate ($LiCoO_2$).

In some embodiments, the cathode active material may have a coating on its surface or may be mixed with another compound having a coating. The coating may include at least one coating element compound selected from an oxide of the coating element, a hydroxide of the coating element, an oxyhydroxide of the coating element, a bicarbonate of the coating element and a hydroxycarbonate of the coating element. The compound used for the coating may be amorphous or crystalline.

In some embodiments, the coating element contained in the coating layer may include Mg, Al, Co, K, Na, Ca, Si, Ti, V, Sn, Ge, Ga, B, As, Zr or any combination thereof. The coating may be applied by any method as long as the method does not adversely affect the performance of the cathode active material. For example, the method may include spraying, dipping, and the like.

The cathode active material layer further includes a binder, and optionally includes a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, ethylene oxide containing polymers, polyvinylpyrrolidone, polyurethane, polytetrafluoroethylene, poly(1,1-difluoroethylene), polyethylene, polypropylene, styrene-butadiene rubber, acrylated styrene-butadiene rubber, epoxy resin, nylon, and the like. In some embodiments, the binder is poly(1,1-difluoroethylene).

In some embodiments, the conductive material includes, but is not limited to, a carbon-based material, a metal-based material, a conductive polymer and a mixture thereof. In some embodiments, the carbon-based material is selected from natural graphite, artificial graphite, carbon black, acetylene black, Ketjen black, carbon fibers and any combination thereof. In some embodiments, the carbon-based material is carbon black. In some embodiments, the metal-based material is selected from metal powder, metal fibers, copper, nickel, aluminum and silver. In some embodiments, the conductive polymer is a polyphenylene derivative.

In some embodiments, the current collector is aluminum.

The cathode may be prepared by a preparation method well known to those skilled in the art. For example, the cathode may be obtained by the following method: mixing an active material, a conductive material and a binder in a solvent to prepare an active material composition, and coating the active material composition on a current collector. In some embodiments, the solvent may include N-methylpyrrolidone or the like, but is not limited thereto.

III. Electrolyte

Electrolytes applicable in the electrolyte of the embodiments of the present application include, but are not limited to, inorganic lithium salts, such as $LiClO_4$, $LiAsF_6$, $LiPF_6$, $LiBF_4$, $LiSbF_6$, $LiSO_3F$, $LiN(FSO_2)_2$, and the like; fluorine-containing organic lithium salts, such as $LiCF_3SO_3$, $LiN(FSO_2)(CF_3SO_2)$, $LiN(CF_3SO_2)_2$, $LiN(C_2F_5SO_2)_2$, cyclic lithium 1,3-hexafluoropropanedisulfonimide, cyclic 1,2-tetrafluoroethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$ and $LiBF_2(C_2F_5SO_2)_2$; and lithium salts containing dicarboxylic acid complex, such as lithium bis(oxalate) borate, lithium difluorooxalate borate, lithium tris(oxalate) phosphate, lithium difluorobis(oxalate) phosphate and lithium tetrafluoro(oxalate)phosphate. Further, the foregoing electrolytes may be used singly or in combination of two or more. For example, in some embodiments, the electrolyte includes a combination of $LiPF_6$ and $LiBF_4$. In some embodiments, the electrolyte includes a combination of an inorganic lithium salt such as $LiPF_6$, $LiBF_4$ or the like and a fluorine-containing organic lithium salt such as $LiCF_3SO_3$, $LiN(CF_3SO_2)_2$, $LiN(C_2F_5SO_2)_2$ or the like. In some embodiments, the concentration of the electrolyte is in the range of about 0.8 mol/L to about 3 mol/L, such as in the range of about 0.8 mol/L to about 2.5 mol/L, in the range of about 0.8 mol/L to about 2 mol/L or in the range of about 1 mol/L to about 2 mol/L, for example, about 1 mol/L, about 1.15 mol/L, about 1.2 mol/L, about 1.5 mol/L, about 2 mol/L or about 2.5 mol/L.

IV. Separator

In some embodiments, a separator is arranged between the cathode and the anode to prevent short circuit. The material and shape of the separator which can be used in the embodiments of the present application are not particularly limited, and may be any technique well known to those skilled in the art. In some embodiments, the separator includes a polymer or an inorganic substance and the like formed by a material stable in the electrolyte solution of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, polypropylene nonwoven cloth, polyethylene nonwoven cloth or a polypropylene-polyethylene-polypropylene porous composite film can be adopted. In some embodiments, the separator is a polyethylene (PE) porous polymer film.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

V. Electrochemical Device

The electrochemical device of the present application includes any device that generates an electrochemical reaction, and its specific examples include all kinds of primary batteries, secondary batteries, fuel cells, solar cells or capacitors. In particular, the electrochemical device is a lithium secondary battery, including a lithium metal secondary battery, a lithium-ion secondary battery, a lithium polymer secondary battery or a lithium ion polymer secondary battery. In some embodiments, the electrochemical device of the present application includes a cathode having a cathode active substance capable of occluding and releasing metal ions; an anode according to the embodiments of the present application; an electrolyte; and a separator arranged between the cathode and the anode.

VI. Electronic Device

The use of the electrochemical device of the present application is not particularly limited and can be used in any electronic device known in the prior art. In one embodiment, the electrochemical device of the present application can be used for, but not limited to, notebook computers, pen input computers, mobile computers, e-book players, portable telephones, portable fax machines, portable copy machines, portable printers, headset stereo headphones, VCRs, LCD TVs, portable cleaners, portable CD players, mini disc players, transceivers, electronic notebooks, calculators, memory cards, portable recorders, radios, backup power devices, motors, cars, motorcycles, power bicycles, bicycles, lighting fixtures, toys, game consoles, clocks, power tools, flashlights, cameras, large household batteries, lithium ion capacitors, and the like.

Hereinafter, the lithium-ion battery is taken as an example and the preparation of the lithium-ion battery is described in conjunction with a specific embodiment. Those skilled in the art would understand that the preparation method described in the present application is merely an example, and any other suitable preparation methods fall within the scope of the present application.

EXAMPLES

The following describes examples of the lithium-ion battery according to the present application and comparative examples for performance evaluation.

I. Preparation of Lithium-Ion Battery

1. Preparation of Anode 0.05-50 g of modifier was added to 500 g of an absolute ethanol solution and dissolved thoroughly, and a 0.1 M NaOH solution was added dropwise to promote silane hydrolysis and material surface reaction (the amount of water added was calculated based on the number of alkoxys in the modifier, where the molar ratio of the NaOH solution to the alkoxy was 1-2). The concentration of the modifier in ethanol was adjusted to 0.01-10 wt %. 100 g of pre-lithiated silicon-oxygen material (C %=3.2%, D50=6.4 μm, silicon grain size is 5 nm, the buffer phase is $Li_2SiO_3$) was added to the above solution, and stirred at 800-1,200 rpm for 4 hours to obtain a suspension. The suspension was filtered to obtain a solid. The solid was dried at 80° C. overnight to obtain a dried material. The dried material was pulverized and sieved through a 400-mesh sieve to obtain the anode active material (Embodiments 1 to 11).

Graphite, the modified pre-lithiated silicon-oxygen material, a conductive agent (conductive carbon black, Super P®) and a binder (modified polyacrylic acid, PAA) were mixed according to a mass ratio of 70%:15%:5%:10%, an appropriate amount of water was added, and kneading was performed to obtain a solid content of 55-70%. An appropriate amount of water was added to adjust the viscosity of the slurry to 4000-6000 Pa·s to prepare an anode slurry. The obtained anode slurry was coated on a copper foil anode current collector, dried, and subjected to cold-pressing to obtain the anode.

2. Preparation of Cathode $LiCoO_2$, conductive carbon black and polyvinylidene fluoride (PVDF) were thoroughly stirred and uniformly mixed in a mass ratio of 95%:2.5%:2.5% in an N-methylpyrrolidone solvent mix to obtain a cathode slurry. The obtained cathode slurry was coated on an aluminum foil cathode current collector, dried, and subjected to cold-pressing to obtain the cathode.

3. Preparation of Electrolyte

In a dry argon atmosphere, in a solvent mixed from propylene carbonate (PC), ethylene carbonate (EC) and diethyl carbonate (DEC) (weight ratio is 1:1:1), $LiPF_6$ was added and mixed uniformly, the concentration of $LiPF_6$ being 1.15 mol/L, and then 7.5 wt % of fluoroethylene carbonate (FEC) was added and mixed uniformly to obtain the electrolyte.

4. Preparation of Separator

A PE porous polymer film was used as a separator.

5. Preparation of Lithium-Ion Battery

The cathode, the separator and the anode were stacked sequentially, so that the separator was positioned between the cathode and the anode performed the function of separation, and a bare cell was obtained by winding. The bare battery cell was put in an outer package, the electrolyte was injected into it, and packaging was performed. Techniques such as formation, degassing, trimming and the like were performed to obtain the lithium-ion battery.

II. Testing Methods

1. Fourier Infrared Spectroscopy Characterization Method of Anode Active Material A small amount of modified anode material and dried potassium bromide were ground, uniformly mixed, pressed into a sheet by a sheeter, and the sheet was tested by using a Fourier infrared tester and scanned from 500 cm$^{-1}$ to 4,000 cm$^{-1}$.

2. Method for Evaluating Precipitation of Anode Slurry

The anode active material slurry was stored for 48 hours, and the final viscosity of the anode slurry was measured. The final viscosity was compared with the initial viscosity, and when the viscosity reduction was less than 1000 Pa·s, it was recorded as no precipitation; when the viscosity reduction was 1000-2000 Pa·s, it was recorded as slight precipitation; and when the viscosity reduction was greater than 2000 Pa·s, it was recorded as severe precipitation.

3. Method for Evaluating Gelation of Anode Slurry

The anode active material slurry was stored for 48 hours, and the particles of the lower layer of the anode slurry were measured by the dynamic light scattering method. When 50-100 μm particles appeared in the anode slurry, it was recorded as slight gelation; and when 100-1000 μm particles appeared in the anode slurry, it was recorded as severe gelation.

4. Method for Measuring Gas Production Rate of Anode Slurry 100 g of the anode active material slurry was sealed in a 250 mL closed vessel for 48 hours. The proportion of hydrogen produced was tested by gas chromatography. According to the reaction principle, the other gases in the system were substantially unchanged, and the gas production rate was characterized by the volume ratio of hydrogen in the entire mixed system in the case where only hydrogen was generated.

III. Test Results

The following table shows the composition and stability (precipitation, gelation and gas production rate) of the anode active material according to the comparative examples of the prior art and the embodiments of the present application.

$-\!\!+\!\!CH_2\!\!+\!\!-_c$ structural unit in the coating layer. Similarly, after a fluorosilane modifier was added to the matrix material of the anode active material, the Fourier infrared spectrum of the obtained anode active material had characteristic absorption peaks of 2,844 cm$^{-1}$ and 2,910 cm$^{-1}$, indicating the presence of a $-\!\!+\!\!CF_2\!\!+\!\!-_a$ or $-\!\!+\!\!CHF\!\!+\!\!-_b$ structural unit in the coating layer.

The results in the above table show that, in comparison with Comparative Example 1, the long chain silane modifier was added into the matrix material of the anode active material in Examples 1-11, so that the coating layer and the lithiated silicon-oxygen material of the anode active material at least have a structural unit of formulae $-\!\!+\!\!CF_2\!\!+\!\!-_a$, $-\!\!+\!\!CHF\!\!+\!\!-_b$ or $-\!\!+\!\!CH_2\!\!+\!\!-_c$ therebetween (where a, b, and c are integers greater than or equal to 6), which can significantly reduce the precipitation, gelation degree and/or amount of hydrogen generated by the pre-lithiated silicon-oxygen anode active material, thereby significantly improving the stability of the anode active material. Examples 2, 3, 5 and 6 show that the larger the carbon chain length, the more tightly the surface of the lithiated silicon-oxygen material is coated with the silane, and the better the stability of the anode active material. Likewise, Examples 8 and 9 also demonstrate this trend. Examples 1 and 8 show that the fluorine-containing silane modifier can further improve the stability of the anode active material in the case where the carbon chain length is the same, because fluorine atoms can make the long chain silane shrink tighter, thereby enhancing its hydrophobicity.

FIG. 2A shows a surface morphology of the anode active material of Comparative Example 1. FIG. 2B shows a surface morphology of the anode active material of Example 9. Comparing FIG. 2A and FIG. 2B, the surface of the lithiated silicon-oxygen material treated with the silane

|  | Modifier | Precipitation | Gelation | Gas production rate of hydrogen (volume percent) |
|---|---|---|---|---|
| Example 1 | Tridecafluoro-n-octyltriethoxysilane | No precipitation | No gelation | No |
| Example 2 | Hexyltrimethoxysilane | Slight precipitation | Slight gelation | 3.5% |
| Example 3 | Dodecyltrimethoxysilane | No precipitation | Slight gelation | 1.2% |
| Example 4 | Trimethoxy(7-octen-1-yl)silane | No precipitation | Slight gelation | 6.2% |
| Example 5 | Octadecyltrimethoxysilane | No precipitation | No gelation | 1.1% |
| Example 6 | Octyltrimethoxysilane | Slight precipitation | No gelation | 1.0% |
| Example 7 | Heptadecafluorodecyltrimethoxysilane | No precipitation | No gelation | No |
| Example 8 | n-octyltriethoxysilane | Slight precipitation | Slight gelation | 4% |
| Example 9 | Octadecyltriethoxysilane | No precipitation | No gelation | No |
| Example 10 | Tridecafluoro-n-octyltriethoxysilane | Slight precipitation | Slight gelation | 4.5% |
| Example 11 | (1,3,5-trifluorododecyl)trimethoxysilane | No precipitation | Slight gelation | 0.3% |
| Comparative Example 1 | — | Severe precipitation | Severe gelation | 76% |

As shown in FIG. 1, after the octadecyltriethoxysilane was added to the matrix material of the anode active material, the Fourier infrared spectrum of the obtained anode active material had characteristic absorption peaks of 2,847 cm$^{-1}$ and 2,917 cm$^{-1}$, indicating the presence of a modifier has a coating layer which blocks the penetration of water molecules from the interior of the lithiated silicon-oxygen material.

As shown in FIG. 3A, the anode active material slurry of Comparative Example 1 generated severe precipitation and severe gelation after standing for 48 h. However, as shown in FIG. 3B, the anode active material slurry of Example 9 did not generate precipitation or gelation after standing for 48 h.

The foregoing examples used only $Li_2SiO_3$ as the buffer phase to prepare the anode active material, and evaluated its performance. These examples should not be construed as limiting the lithiated silicon-oxygen material. Other lithiated silicon-oxygen materials (e.g. one or more of $Li_6Si_2O_7$, $Li_2Si_2O_5$ and $Li_4SiO_4$) of the present application can achieve substantially the same effect as $Li_2SiO_3$.

References to "some embodiments", "part of embodiments", "one embodiment", "another example", "example", "specific example" or "part of examples" in the whole specification mean that at least one embodiment or example in the application comprises specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. An anode active material, comprising a lithiated silicon-oxygen material and a coating layer, wherein the coating layer and the lithiated silicon-oxygen material at least have one or more structural units selected from the group consisting of formulae $-\!\!\!+\!\!CF_2\!\!+\!\!\!-_a$, $-\!\!\!+\!\!CHF\!\!+\!\!\!-_b$ and $-\!\!\!+\!\!CH_2\!\!+\!\!\!-_c$ therebetween, wherein a, b, and c are integers greater than or equal to 6, and wherein the one or more structural units are derived from a silane having the one or more structural units.

2. The anode active material according to claim 1, wherein the lithiated silicon-oxygen material comprises one or more of $Li_2SiO_3$, $Li_6Si_2O_7$, $Li_2Si_2O_5$ and $Li_4SiO_4$.

3. The anode active material according to claim 1, wherein the coating layer and the lithiated silicon-oxygen material at least have an —O—Si—R bond therebetween, wherein R is the one or more structural units.

4. The anode active material according to claim 3, wherein the silane has the following formula:

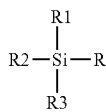

wherein:
R, R1, R2 and R3 are each independently selected from hydrogen, $C_{6-24}$alkyl, $C_{6-24}$fluoroalkyl or $C_{1-3}$alkoxy.

5. The anode active material according to claim 4, wherein at least one of R, R1, R2 and R3 is $C_{6-24}$alkyl and at least one of them is $C_{1-3}$alkoxy.

6. The anode active material according to claim 4, wherein at least one of R, R1, R2 and R3 is $C_{6-24}$fluoroalkyl and at least one of them is $C_{1-3}$alkoxy.

7. The anode active material according to claim 3, wherein the silane is selected from the group consisting of one or more of the following: tridecafluoro-n-octyltriethoxysilane, hexyltrimethoxysilane, dodecyltrimethoxysilane, trimethoxy(7-octen-1-yl)silane, octadecyltrimethoxysilane, octyltrimethoxysilane, heptadecafluorodecyltrimethoxysilane, n-octyltriethoxysilane, octadecyltriethoxysilane and octylmethyldimethoxysilane.

8. The anode active material according to claim 1, wherein a Fourier infrared spectrum of the anode active material has characteristic absorption peaks of $2,847\pm5$ cm$^{-1}$ and $2,917\pm5$ cm$^{-1}$.

9. The anode active material according to claim 1, wherein the lithiated silicon-oxygen material comprises nano silicon grains, the nano silicon grains having a grain size of less than about 10 nm.

10. An anode, comprising a substrate and the anode active material according to claim 1.

11. The anode according to claim 10, wherein the lithiated silicon-oxygen material comprises one or more of $Li_2SiO_3$, $Li_6Si_2O_7$, $Li_2Si_2O_5$ and $Li_4SiO_4$.

12. The anode according to claim 10, wherein the coating layer and the lithiated silicon-oxygen material at least have an —O—Si—R bond therebetween, wherein R is the one or more structural units.

13. The anode according to claim 1, wherein the silane has the following formula:

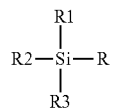

wherein:
R, R1, R2 and R3 are each independently selected from hydrogen, $C_{6-24}$alkyl, $C_{6-24}$fluoroalkyl or $C_{1-3}$alkoxy.

14. The anode according to claim 13, wherein at least one of R, R1, R2 and R3 is $C_{6-24}$alkyl and at least one of them is $C_{1-3}$alkoxy.

15. The anode according to claim 13, wherein at least one of R, R1, R2 and R3 is $C_{6-24}$fluoroalkyl and at least one of them is $C_{1-3}$alkoxy.

16. The anode according to claim 1, wherein the silane is selected from the group consisting of one or more of the following: tridecafluoro-n-octyltriethoxysilane, hexyltrimethoxysilane, dodecyltrimethoxysilane, trimethoxy(7-octen-1-yl)silane, octadecyltrimethoxysilane, octyltrimethoxysilane, heptadecafluorodecyltrimethoxysilane, n-octyltriethoxysilane, octadecyltriethoxysilane and octylmethyldimethoxysilane.

17. The anode according to claim 10, wherein a Fourier infrared spectrum of the anode active material has characteristic absorption peaks of $2,847\pm5$ cm$^{-1}$ and $2,917\pm5$ cm$^{-1}$.

18. The anode according to claim 10, wherein the lithiated silicon-oxygen material comprises nano silicon grains, the nano silicon grains having a grain size of less than about 10 nm.

19. An electrochemical device, comprising a cathode and the anode according to claim 10.

20. An electronic device, comprising the electrochemical device according to claim 19.

* * * * *